(12) United States Patent
Maresh et al.

(10) Patent No.: US 11,623,742 B2
(45) Date of Patent: Apr. 11, 2023

(54) CENTRIFUGAL FORCE BEARING

(71) Applicant: Bell Helicopter Textron Inc., Fort Worth, TX (US)

(72) Inventors: Andrew Ryan Maresh, Lewisville, TX (US); Christopher Edward Foskey, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 1045 days.

(21) Appl. No.: 16/372,289

(22) Filed: Apr. 1, 2019

(65) Prior Publication Data

US 2019/0300164 A1 Oct. 3, 2019

Related U.S. Application Data

(60) Provisional application No. 62/651,462, filed on Apr. 2, 2018.

(51) Int. Cl.
*B64C 27/00* (2006.01)
*F16C 17/02* (2006.01)
*B64C 27/32* (2006.01)

(52) U.S. Cl.
CPC ............ *B64C 27/001* (2013.01); *F16C 17/02* (2013.01); *B64C 27/32* (2013.01); *F16C 2208/10* (2013.01); *F16C 2326/43* (2013.01)

(58) Field of Classification Search
CPC ....... B64C 27/001; B64C 27/35; B64C 27/33; B64C 27/51; B64C 27/48; B64C 11/04; F16C 17/02; F16C 2326/43
See application file for complete search history.

(56) References Cited

U.S. PATENT DOCUMENTS

| 4,251,187 | A * | 2/1981 | Hollrock | B64C 27/35 416/134 A |
|---|---|---|---|---|
| 4,373,862 | A * | 2/1983 | Ferris | B64C 27/48 416/61 |
| 8,231,346 | B2 * | 7/2012 | Stamps | F16F 1/40 416/134 A |
| 9,347,487 | B2 * | 5/2016 | Anderson | F16C 33/201 |
| 9,873,507 | B2 * | 1/2018 | Foskey | B64C 27/35 |
| 10,309,371 | B2 * | 6/2019 | Hinks | B64C 11/06 |
| 10,479,497 | B2 * | 11/2019 | Wardlaw | B64C 29/0033 |
| 10,486,807 | B2 * | 11/2019 | Dearman | B64C 27/41 |
| 10,494,091 | B2 * | 12/2019 | Kizhakkepat | F16C 33/22 |
| 10,507,912 | B2 * | 12/2019 | Kizhakkepat | B64C 27/35 |
| 10,514,060 | B2 * | 12/2019 | Shimek | F16C 27/063 |
| 11,208,204 | B2 * | 12/2021 | Foskey | B64C 29/0033 |
| 2010/0230529 | A1 * | 9/2010 | Stamps | F16F 1/40 244/17.11 |
| 2012/0257847 | A1 * | 10/2012 | Allred | F16F 1/41 29/898.04 |
| 2014/0328685 | A1 * | 11/2014 | Davis | F16C 11/0614 416/113 |

(Continued)

FOREIGN PATENT DOCUMENTS

GB          2302074 A  *  1/1997  ............ B64C 27/39

*Primary Examiner* — Philip J Bonzell
(74) *Attorney, Agent, or Firm* — Lightfoot & Alford PLLC

(57) ABSTRACT

An elastomeric bearing assembly has a housing, a centrifugal force bearing axially captured relative to the housing, and a sliding cap disposed between the housing and the centrifugal force bearing.

18 Claims, 5 Drawing Sheets

(56) References Cited

U.S. PATENT DOCUMENTS

| | | | |
|---|---|---|---|
| 2015/0239555 A1* | 8/2015 | Foskey | B64C 11/04 |
| | | | 416/134 A |
| 2015/0345551 A1* | 12/2015 | Anderson | F16C 33/06 |
| | | | 384/125 |
| 2017/0334549 A1* | 11/2017 | Hinks | F03D 7/0224 |
| 2018/0072409 A1* | 3/2018 | Foskey | B64C 29/0033 |
| 2019/0016454 A1* | 1/2019 | Cravener | F16C 33/22 |
| 2019/0016455 A1* | 1/2019 | Kizhakkepat | B64C 11/06 |
| 2019/0016456 A1* | 1/2019 | Dearman | B64C 27/12 |
| 2019/0016457 A1* | 1/2019 | Wardlaw | B64C 29/0033 |
| 2019/0016458 A1* | 1/2019 | Kizhakkepat | B64C 11/06 |
| 2019/0017543 A1* | 1/2019 | Shimek | F16C 27/063 |
| 2022/0063797 A1* | 3/2022 | Baskin | B64C 11/28 |

* cited by examiner

CENTRIFUGAL FORCE BEARING

CROSS-REFERENCE TO RELATED APPLICATIONS

This patent application claims the benefit of the filing date of U.S. Provisional Patent Application Ser. No. 62/651,462, filed on 2 Apr. 2018 and entitled "CENTRIFUGAL FORCE BEARING," the entire content of which is hereby expressly incorporated by reference.

STATEMENT REGARDING FEDERALLY SPONSORED RESEARCH OR DEVELOPMENT

Not applicable.

BACKGROUND

Centrifugal forces and feathering motions experienced by the blade of a rotorcraft are managed by discrete bearings. While some bearings allow for torsional movement during operation of the rotorcraft, the bearings unnecessarily oppose torsional movement even when the rotorcraft is not being operated and/or while centrifugal forces are minimal.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The systems and methods disclosed herein can be utilized in a rotorcraft substantially similar to the rotorcraft 100 of U.S. Pat. No. 9,873,507, which is hereby incorporated by reference in its entirety, but with the added benefit of reduced resistance to torsional rotation of a centrifugal force bearing when the bearing assembly is loaded with centrifugal force below a threshold value.

Figure 1:
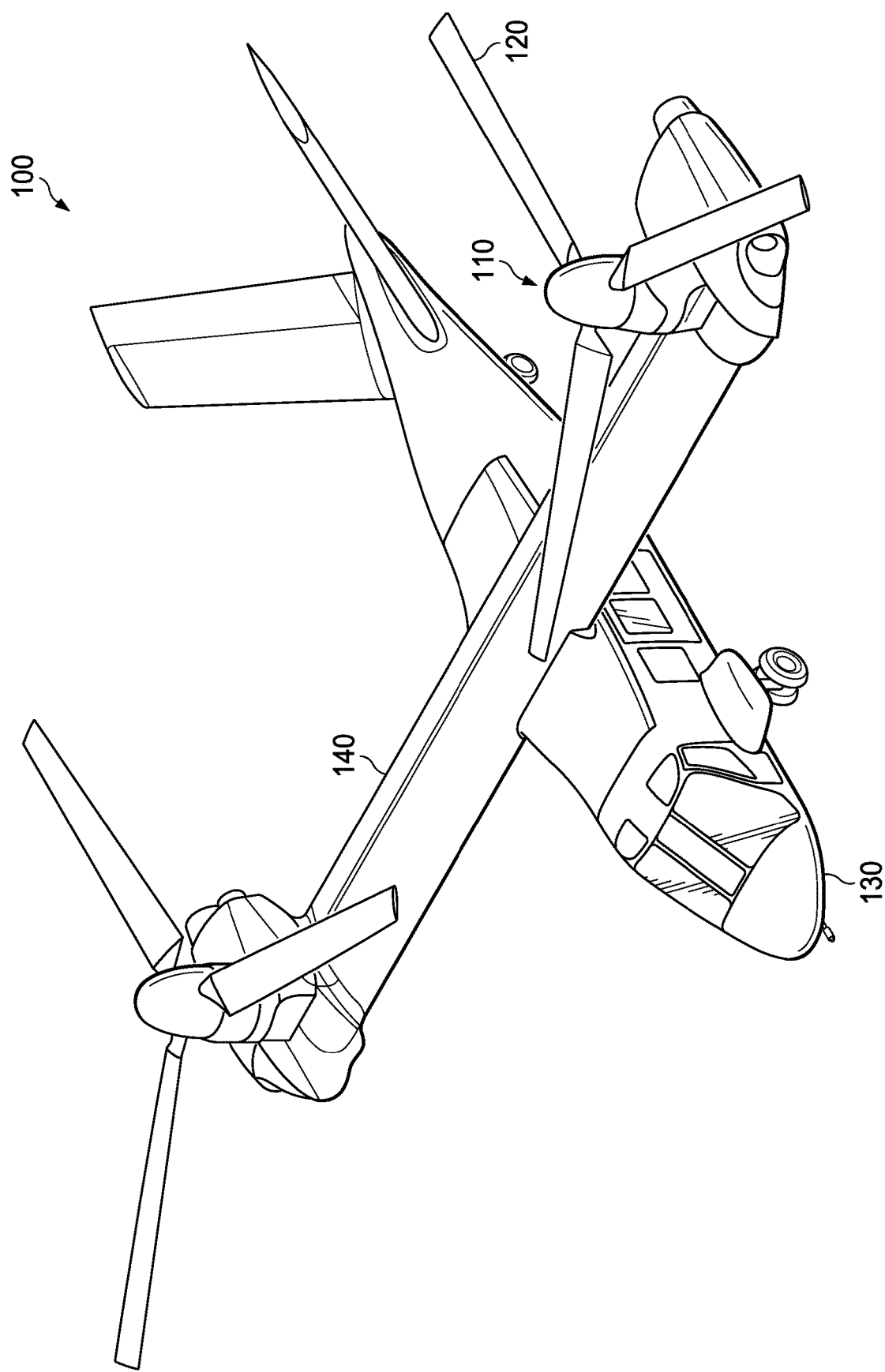
FIG. 1 is a rotorcraft comprising an elastomeric bearing assembly according to an embodiment of this disclosure.

FIG. 1 shows a rotorcraft 100 according to one example embodiment. Rotorcraft 100 features one or more rotor systems 110, a fuselage 130, and a wing 140. Rotor system 110 can include blades 120, a control system, and a pitch horn 160 for selectively controlling the pitch of each blade 120 to control direction, thrust, and lift of rotorcraft 100. In the example of FIG. 1, rotorcraft 100 represents a tiltrotor aircraft, and rotor system 110 features rotatable nacelles. In this example, the position of the nacelles operate rotorcraft 100 in both helicopter and airplane modes. Fuselage 130 represents the main body of rotorcraft 100 and can be coupled to one or more rotor systems 110 (e.g., via wing 140) such that rotor system 110 can provide thrust to move fuselage 130 through the air. Wing 140 can also generate lift during forward flight.

Figure 2:
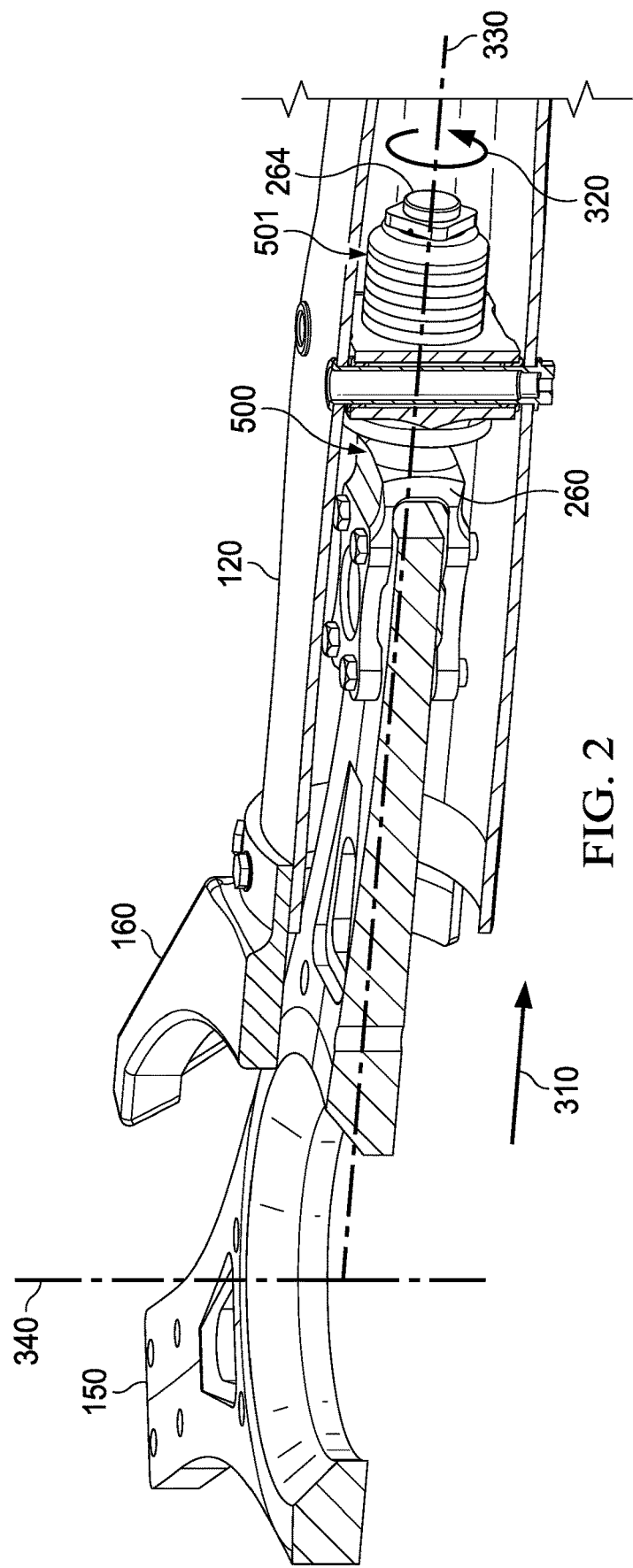
FIG. 2 is an oblique section view of a rotor system of the rotorcraft of FIG. 1.

Referring now to FIG. 2, a propulsion system provides torque to a rotor mast (not shown). Yoke 150 is coupled to the rotor mast such that rotation of the rotor mast causes yoke 150 and rotor blade 120 to rotate about the rotor mast axis 340 of rotation. Each yoke 150 further includes at least one elastomeric bearing assembly 500 for receiving and coupling to each rotor blade 120. Elastomeric bearing assembly 500 can be configured to treat and react a plurality of dynamic forces, such as centrifugal force 310.

Figure 3:
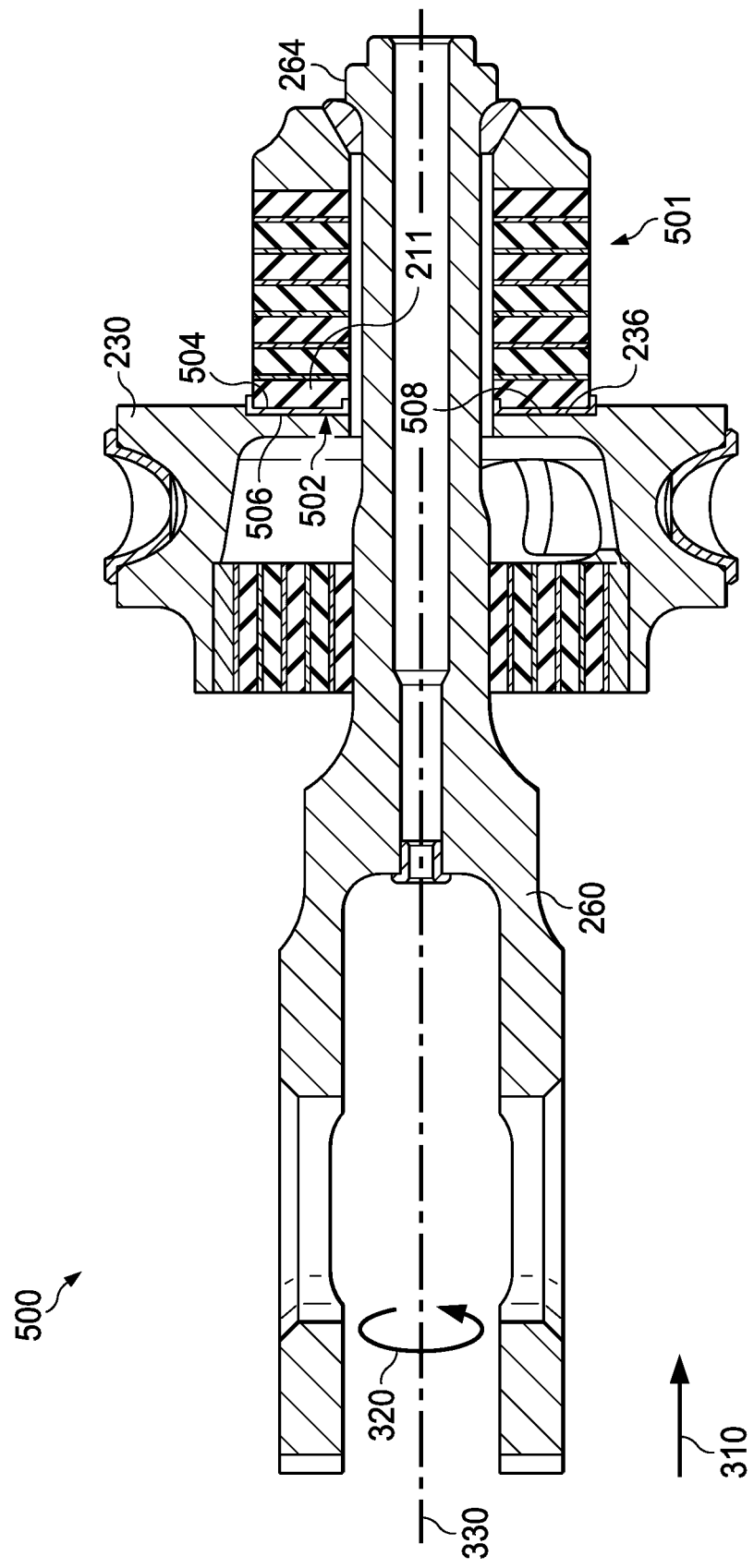
FIG. 3 is a side section view of an elastomeric bearing assembly of the rotor system of FIG. 2.

Referring now to FIG. 3, an elastomeric bearing assembly 500 is shown. The elastomeric bearing assembly 500 is substantially similar to the elastomeric bearing assembly 200 of FIG. 4 of U.S. Pat. No. 9,873,507, but the centrifugal force bearing 501 is not vulcanized or adhered to surface 236 of housing 230. Instead, the centrifugal force bearing 501 further comprises a sliding cap 502. The sliding cap 502 can be constructed of metal and comprises an interior profile 504 configured to receive an elastomeric layer 211. The sliding cap 502 further comprises an exterior profile 506 configured to complement a receiving profile 508 of the housing 230. One or both of the exterior profile 506 and the receiving profile 508 can be provided a nonstick surface coating or finish, such as, but not limited to, a polytetrafluoroethylene (PTFE) coating. In this embodiment, the centrifugal force bearing 501 is captured between a housing 230 and an outboard portion 264 of a spindle 260. In this embodiment, the exterior profile 506 and the receiving profile 508 are shown as comprising substantially cylindrical profiles so that, in response to a torsional force 320, rotation of the centrifugal force bearing 501 about the center axis 330 is allowed when the centrifugal force bearing 501 is loaded with less than a threshold amount of centrifugal force. In some cases, the centrifugal force bearing 501 can freely rotate relative to the housing 230 when the centrifugal force bearing 501 is fully unloaded, such as while the rotorcraft is not operating to spin the rotor system 110. In some cases, the centrifugal force bearing 501 can freely rotate relative to the housing 230 when the centrifugal force bearing 501 is loaded with less than a threshold amount of centrifugal force. By unloading the centrifugal force bearing 501, the elastomeric components that otherwise carry the centrifugal force are relaxed and do not experience extended feathering torque and motion. Such relaxation of the elastomeric components of the centrifugal force bearing can result in not only a longer lifespan, but can also permit a much more tailored, lightweight, and efficient design in the centrifugal force bearing 501 itself as it does not need to be sized to accommodate the extended feathering torque and motion.

Figure 5:
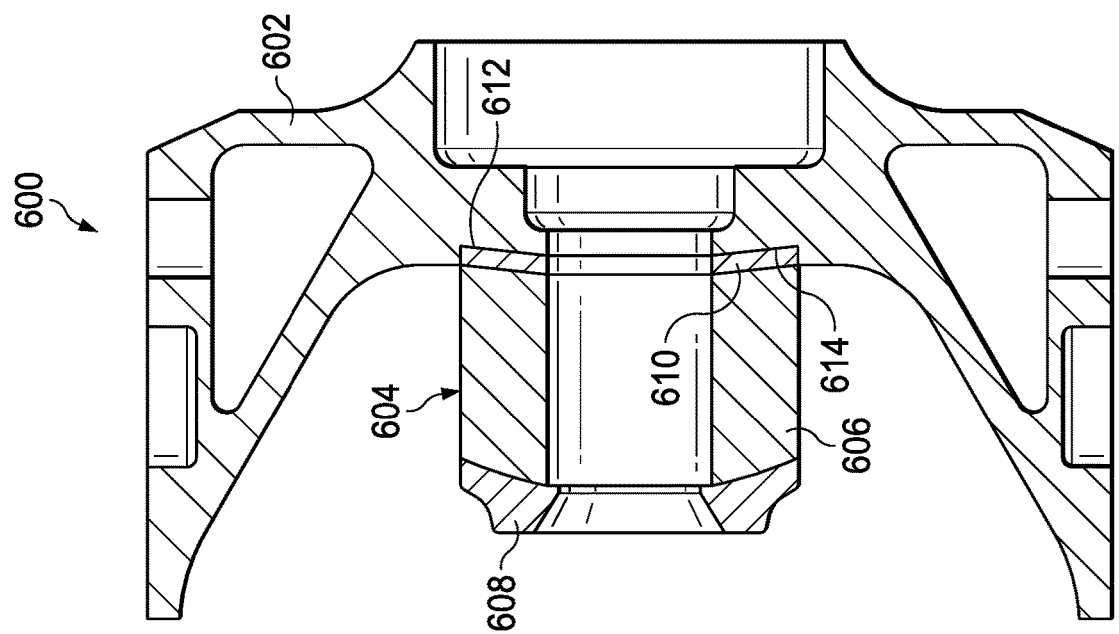
FIG. 5 is an oblique cutaway view of the elastomeric bearing assembly of FIG. 4.
Figure 4:
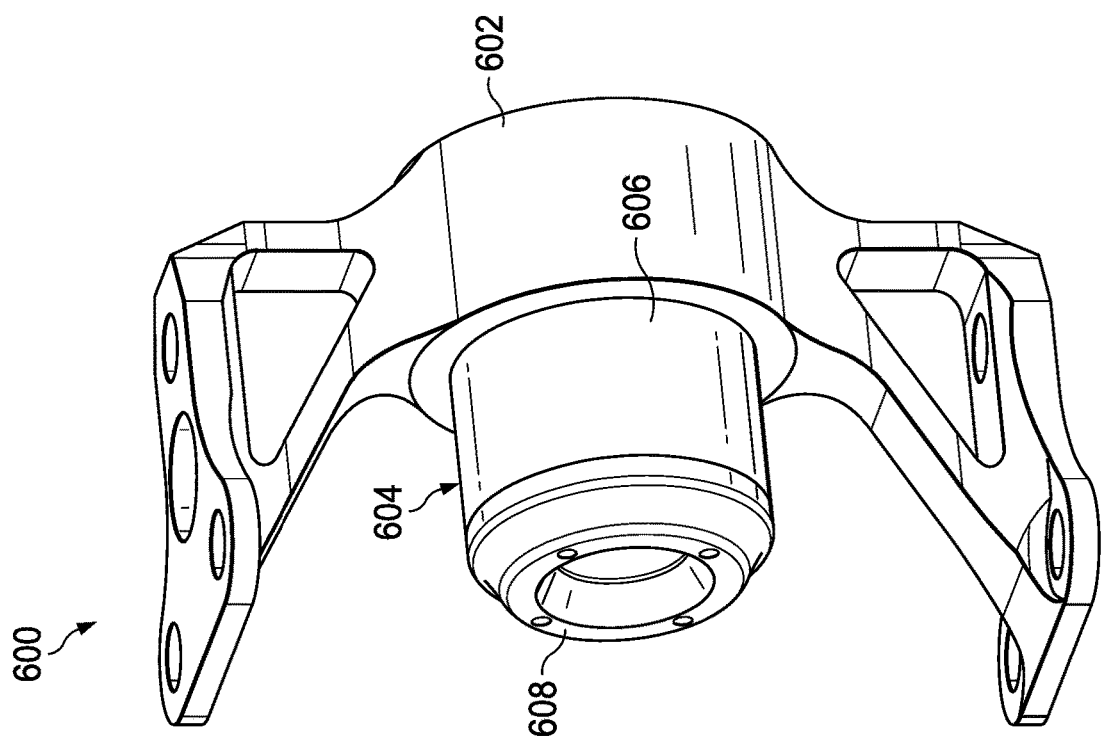
FIG. 4 is an oblique view of a portion of an alternative embodiment of an elastomeric bearing assembly.

Referring now to FIGS. 4 and 5, an oblique side view and an oblique cutaway view of a portion of a bearing assembly 600 are shown, respectively. The bearing assembly 600 comprises an inboard beam mount 602 configured to receive a centrifugal force bearing 604 that is substantially similar to the centrifugal force bearing 501. The centrifugal force bearing 604 comprises a bearing stack 606 of alternating rigid shims and flexible elastomeric members captured between a cap 608 and a sliding plate 610. In this embodiment, the sliding plate 610 comprises metal and comprises an exterior profile 612 that is provided with a nonstick surface coating or finish, such as, but not limited to, a polytetrafluoroethylene (PTFE) coating. The exterior profile 612 is shaped to complement a receiving profile 614 of the inboard beam mount 602 so that when the centrifugal force bearing 604 is sufficiently relieved of centrifugal forces, the centrifugal force bearing 604 can rotate about a central axis of the centrifugal force bearing 604 and relative to the receiving profile 614. As shown, each of the receiving profile 614 and the exterior profile 612 can comprise an at least partially spherical curvature that, in some cases, can allow the centrifugal force bearing 604 to cock relative to a central axis of the inboard beam mount 602. In this case, the receiving profile 614 comprises a convex shape that is complementary to a concave shape of the exterior profile 612.

In alternative embodiments, one or more of the receiving profile and exterior profiles can be provided as a portion of a replaceable component that can be received and retained by a corresponding feature of a mount or of a centrifugal force bearing. In some embodiments, under load, the friction between the centrifugal force bearing outer profile and receiving profile is great enough to prevent slipping, but the centrifugal force bearing would nonetheless be capable of handling this induced torsional load until relieved. When the centrifugal load is sufficiently relieved, the centrifugal force bearing can slide relative to the mount (such as a housing) without inducing any torsional wind up in the centrifugal force bearing.

Figure 6:
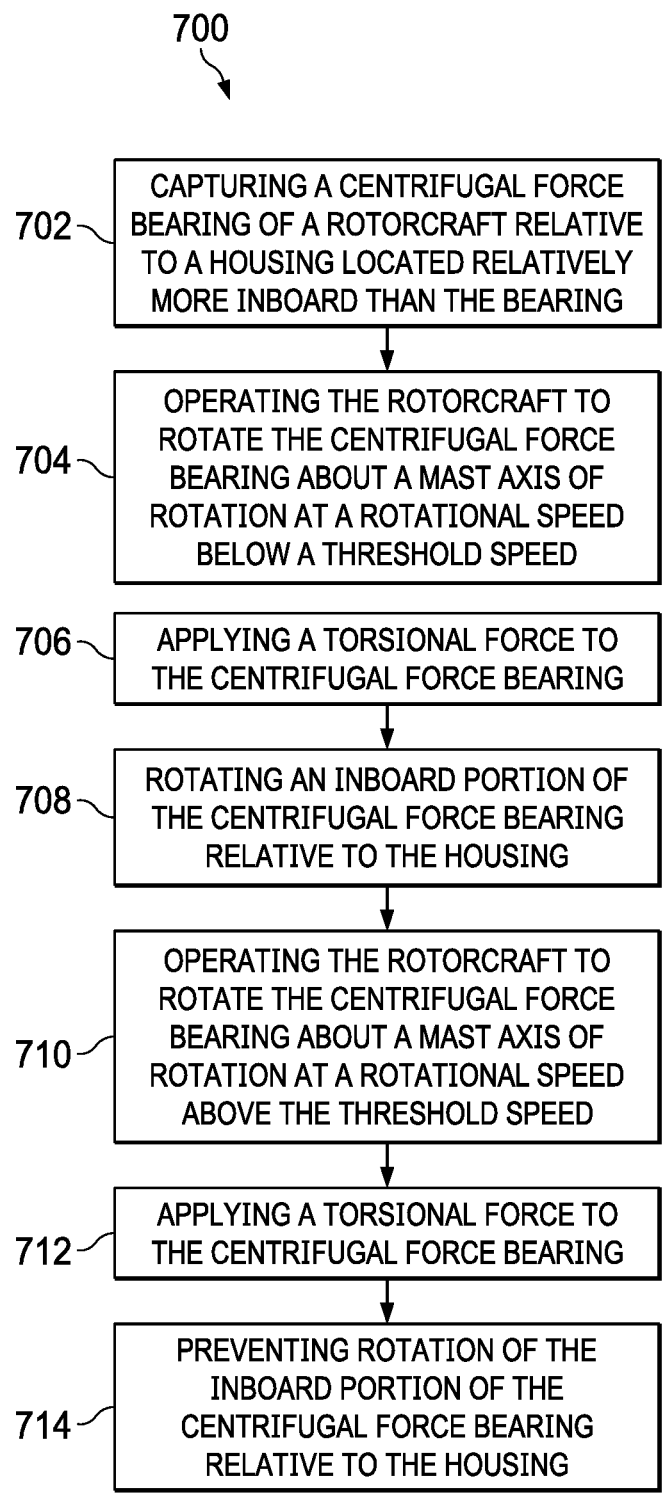
FIG. 6 is a flowchart of a method of operating a rotorcraft according to this disclosure.

Referring now to FIG. 6, a flowchart of a method 700 of operating a rotorcraft is shown. The method 700 can begin at block 702 by axially capturing a centrifugal force bearing relative to a housing located relatively more inboard than the centrifugal force bearing. In some cases, the centrifugal force bearing can be captured by an outboard portion of a spindle and in some cases the spindle can be received through a portion of the centrifugal force bearing. The method 700 can continue at block 704 by operating the rotorcraft to rotate the centrifugal force bearing about a mast axis of rotation at a rotational speed below a threshold speed. The method 700 can continue at block 706 by applying a torsional force to the centrifugal force bearing. The method 700 can continue at block 708 by rotating an inboard portion of the centrifugal force bearing relative to the housing. The method 700 can continue at block 710 by operating the rotorcraft to rotate the centrifugal force bearing about the mast axis of rotation at a rotational speed above a threshold speed. The method 700 can continue at block 712 by applying a torsional force to the centrifugal force bearing. In some cases, the force applied at block 712 may be the same force applied at block 706. The method 700 can continue at block 714 by preventing rotation of the inboard portion of the centrifugal force bearing from rotating relative to the housing.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An elastomeric bearing assembly, comprising:
    a housing;
    a centrifugal force bearing axially captured relative to the housing; and
    a sliding cap disposed between the housing and the centrifugal force bearing, the sliding cap comprising at least one sliding surface configured to allow sliding between the sliding cap and at least one of the housing and the centrifugal force bearing;
    wherein at least a portion of the at least one sliding surface is not axially overlapped by the centrifugal force bearing.

2. The elastomeric bearing assembly of claim 1, wherein the sliding cap comprises an exterior profile comprising a polytetrafluoroethylene coating.

3. The elastomeric bearing assembly of claim 2, wherein at least a portion of the exterior profile is shaped complementary to a receiving profile of the housing.

4. The elastomeric bearing assembly of claim 1, wherein the housing comprises a receiving profile comprising a polytetrafluoroethylene coating.

5. The elastomeric bearing assembly of claim 1, wherein a receiving profile is shaped complementary to an exterior profile of the sliding cap.

6. The elastomeric bearing assembly of claim 1, wherein the centrifugal force bearing is axially captured between the housing and an outboard portion of a spindle.

7. The elastomeric bearing assembly of claim 1, further comprising:
    a spindle axially received through at least a portion of the centrifugal force bearing.

8. A rotorcraft, comprising:
    an elastomeric bearing assembly, comprising:
        a housing;
        a centrifugal force bearing axially captured relative to the housing; and sliding cap disposed between the housing and the centrifugal force bearing, the sliding cap comprising at least one sliding surface configured to allow sliding between the sliding cap and at least one of the housing and the centrifugal force bearing;

wherein at least a portion of the at least one sliding surface is not axially overlapped by the centrifugal force bearing.

9. The rotorcraft of claim 8, wherein the sliding cap comprises an exterior profile comprising a polytetrafluoroethylene coating.

10. The rotorcraft of claim 8, wherein the housing comprises a receiving profile comprising a polytetrafluoroethylene coating.

11. A method of operating a rotorcraft, comprising:
capturing a centrifugal force bearing relative to a housing located relatively more inboard than the centrifugal force bearing;
operating the rotorcraft to rotate the centrifugal force bearing about a mast axis of rotation at a rotational speed below a threshold speed;
applying a torsional force having a first amplitude to the centrifugal force bearing; and
rotating an inboard portion of the centrifugal force bearing relative to the housing, wherein the rotating comprises sliding at least one of the housing and the centrifugal force bearing relative to a sliding surface of a sliding cap disposed between the housing and the centrifugal force bearing.

12. The method of claim 11, further comprising:
operating the rotorcraft to rotate the centrifugal force bearing about the mast axis of rotation at a rotational speed above the threshold speed;
applying the torsional force having the first amplitude to the centrifugal force bearing; and
preventing rotation of the inboard portion of the centrifugal force bearing relative to the housing.

13. The method of claim 12, further comprising:
providing a sliding cap between the centrifugal force bearing and the housing.

14. The method of claim 13, wherein the sliding cap comprises a polytetrafluoroethylene coating.

15. The method of claim 14, wherein the housing comprises a polytetrafluoroethylene coating.

16. The method of claim 12, further comprising:
after preventing rotation of the inboard portion of the centrifugal force bearing relative to the housing, operating the rotorcraft to rotate the centrifugal force bearing about the mast axis of rotation at a rotational speed below the threshold speed.

17. The method of claim 16, further comprising:
applying the torsional force having the first amplitude to the centrifugal force bearing; and
rotating the inboard portion of the centrifugal force bearing relative to the housing.

18. The method of claim 17, wherein the torsional force is applied to the centrifugal force bearing via a spindle received at least partially through the centrifugal force bearing.

* * * * *